United States Patent
Yamamoto et al.

(10) Patent No.: US 6,936,236 B2
(45) Date of Patent: Aug. 30, 2005

(54) METHOD FOR PRODUCING AN INORGANIC OXIDE POWDER

(75) Inventors: Koji Yamamoto, Niihama (JP); Yoshiaki Takeuchi, Niihama (JP)

(73) Assignee: Sumitomo Chemical Company, Limited, Osaka (JP)

( * ) Notice: Subject to any disclaimer, the term of this patent is extended or adjusted under 35 U.S.C. 154(b) by 0 days.

(21) Appl. No.: 09/840,917

(22) Filed: Apr. 25, 2001

(65) Prior Publication Data

US 2001/0036438 A1 Nov. 1, 2001

(30) Foreign Application Priority Data

Apr. 27, 2000 (JP) .......................................... 2000-127221
Sep. 4, 2000 (JP) .......................................... 2000-266642

(51) Int. Cl.$^7$ .................................................. C01F 7/00
(52) U.S. Cl. ............................................ 423/625; 241/5
(58) Field of Search ........................ 423/625, 626–631, 423/608, 635–640, 592, 604–607, 609–624, 632–634, 641–643, 592.1; 241/30, 27, 18, 47, 57, 5

(56) References Cited

U.S. PATENT DOCUMENTS

| | | | | |
|---|---|---|---|---|
| 1,896,020 A | * | 1/1933 | Shimadzu | 423/620 |
| 3,186,648 A | * | 6/1965 | Mandle et al. | 241/34 |
| 4,205,964 A | * | 6/1980 | Hill | 423/625 |
| 4,784,333 A | * | 11/1988 | Hikake et al. | 241/5 |
| 4,930,707 A | * | 6/1990 | Kashiwagi et al. | 241/5 |

OTHER PUBLICATIONS

Japio Abstract, Japanese Publication No. 2000-246127, published Sep. 12, 2000.

Japio Abstract, Japanese Publication No. 06-047306, published Feb. 22, 1994.

* cited by examiner

*Primary Examiner*—Steven Bos
(74) *Attorney, Agent, or Firm*—Sughrue Mion, PLLC

(57) ABSTRACT

An inorganic oxide powder is produced by a method which comprises a step of (i) introducing, into a dry-way pulverizer, an inorganic oxide in an amount of 100 parts by volume and air, nitrogen or a gas mixture thereof in an amount of from about 25,000 to about 160,000 parts by volume to pulverize the inorganic oxide by the dry-way pulverizer, or (ii) introducing, into a medium-stirring-type pulverizer, an inorganic oxide with a BET specific surface area of from about 1 to about 70 m$^2$/g to pulverize the inorganic oxide by the medium-stirring-type pulverizer in a dry way at a specific energy consumption of from about 0.3 to about 1 kWh/kg. The inorganic oxide powder is capable of providing a ceramic with high density and high mechanical strength.

2 Claims, 1 Drawing Sheet

METHOD FOR PRODUCING AN INORGANIC OXIDE POWDER

FIELD OF THE INVENTION

The present invention relates to a method for producing an inorganic oxide powder. Specifically, the present invention relates to a method for producing an inorganic oxide powder suitable as a raw material for ceramics.

BACKGROUND OF THE INVENTION

Powders of an inorganic oxide such as aluminum oxide and zirconium oxide or an inorganic nitride such as aluminum nitride have been known as a raw material for ceramics. These inorganic oxide/nitride powders are molded and then sintered to be ceramics. In general, increasing the density of the polycrystalline ceramics will improve their mechanical strength. This can be achieved using either a method comprising steps of adjusting the particle size of inorganic oxide powders using a dry-way pulverizer and molding and sintering the resulting powders, or a method comprising a step of sintering inorganic oxide powders at a high temperature, and the like. However, the former method has problems such that, in some cases, ceramics with a satisfactorily high density cannot be obtained and that continuous pulverization is difficult to carry out due to accumulation of inorganic oxide powders in a pulverizing chamber. Also, the latter method has problems such that, in some cases, the crystal grains of the resulting polycrystalline ceramics are enlarged, which results in a lowered mechanical strength of the ceramics, and that the production cost increases due to a high energy consumption for the high temperature sintering.

SUMMARY OF THE INVENTION

Inventors of the present invention have enthusiastically investigated an inorganic oxide powder capable of providing a ceramic with high density and high mechanical strength. As a result, the inventors have found that such an inorganic oxide powder can be obtained by pulverizing an inorganic oxide powder in specific conditions.

That is, the present invention provides a method for producing an inorganic oxide powder which comprises a step of (i) introducing, into a dry-way pulverizer, an inorganic oxide in an amount of 100 parts by volume and air, nitrogen or a gas mixture thereof in an amount of from about 25,000 to about 160,000 parts by volume to pulverize the inorganic oxide in the dry-way pulverizer, or (ii) introducing, into a medium-stirring-type pulverizer, an inorganic oxide with a BET specific surface area of from about 1 to about 70 m$^2$/g to pulverize the inorganic oxide in the medium-stirring-type pulverizer under dry conditions at a specific energy consumption of from about 0.3 to about 1 kWh/kg.

The present invention also provides a method for producing an inorganic oxide powder which comprises a step of introducing, into a medium-stirring-type pulverizer, an inorganic oxide with a BET specific surface area of from about 1 to about 70 m$^2$/g in an amount of 100 parts by volume and air, nitrogen or a gas mixture thereof in an amount of from about 25,000 to about 160,000 parts by volume to pulverize the inorganic oxide in the medium-stirring-type pulverizer under dry conditions at a specific energy consumption of from about 0.3 to about 1 kWh/kg.

DETAILED DESCRIPTION OF THE INVENTION

Figure 1A:
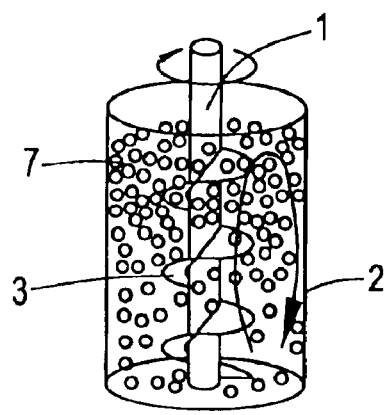
FIG. 1(a) shows a schematic figure of a screw-way (or a tower-way) medium-stirring-type pulverizer applicable to process (ii) of the present invention.

An inorganic oxide powder in the present invention may be produced in a method which comprises a step of (i) introducing, into a dry-way pulverizer, an inorganic oxide in an amount of 100 parts by volume and air, nitrogen or a gas mixture thereof in an amount of from about 25,000 to about 160,000 parts by volume to pulverize the inorganic oxide in the pulverizer, or (ii) introducing, into a medium-stirring-type pulverizer, an inorganic oxide with a BET specific surface area of from about 1 to about 70 m$^2$/g to pulverize the inorganic oxide in the medium-stirring-type pulverizer under dry conditions at a specific energy consumption of from about 0.3 to about 1 kWh/kg.

Alternatively, the inorganic oxide powder may be produced by pulverizing an inorganic oxide in a dry way under both conditions of the above steps (i) and (ii). That is, the inorganic oxide powder may be produced in a method which comprises a step of introducing, into a medium-stirring-type pulverizer, an inorganic oxide with a BET specific surface area of from about 1 to about 70 m$^2$/g in an amount of 100 parts by volume and air, nitrogen or a gas mixture thereof in an amount of from about 25,000 to about 160,000 parts by volume to pulverize the inorganic oxide in the medium-stirring-type pulverizer under dry conditions at a specific energy consumption of from about 0.3 to about 1 kWh/kg.

An inorganic oxide to be used for the present invention may be aluminum oxide ($Al_2O_3$, density: 3.99 g/cm$^3$), zirconium oxide ($ZrO_2$, density: 5.68 g/cm$^3$), magnesium oxide (MgO, density: 3.53 g/cm$^3$) and the like. Among them, aluminum oxide is preferably used. The inorganic oxide may have a BET specific surface area of about 1 to 70 m$^2$/g, or preferably from about 3 to 30 m$^2$/g. In the case that step (ii) is carried out, it may be recommended to use as the inorganic oxide an aluminum oxide having a BET specific surface area of from about 1 to about 70 m$^2$/g and more, preferably that of from about 2 to about 30 m$^2$/g, with the α-type crystal structure. Such an aluminum oxide may contain an intermediate alumina with crystal structure type of γ,δ,θ,η,χ,κ and the like. Further, it is preferred to use an aluminum oxide having a high purity and especially preferred to use that with a lesser content of trace impurities such as silicon, sodium and calcium. By decreasing these impurities, a glass phase formation in the crystal grain boundaries may be suppressed and an enlargement of the crystal grain size may be prevented. As the purity of the aluminum oxide is higher, a dense ceramic with a uniform crystal grain size (grain diameter) tends to be more easily obtained. The preferred purity of aluminum oxide may be about 99.9% or higher. The aluminum oxide with 99.9% or higher purity and the BET specific surface area of preferably 1 to 70 m$^2$/g can be obtained by a method such as an alkoxide method (hydrolysis of organometallic compound), an modified Baeyer process, a thermal cracking of an ammonium alum and a thermal cracking of an ammonium aluminum carbonate (ammonium dawsonite), as well as by utilizing a commercially available aluminum oxide with the requisite high purity and the BET specific surface area Among them, it is preferred to obtain the aluminum oxide by the alkoxide method. The alkoxide method is capable of easily increasing the purity of the resulting aluminum oxide and making the grain size distribution uniform. Specifically, the aluminum oxide with the high purity and the uniform particle size may be obtained by hydrolyzing a purified aluminum alkoxide to obtain an aluminum hydroxide and calcining the aluminum hydroxide in air at about 1100° C. or higher.

In the case that step (i) in the present invention is carried out, an inorganic oxide is pulverized in a dry-way pulverizer, while introducing the inorganic oxide and a gas in a specific ratio thereof, and the inorganic oxide and the gas are preferably introduced continuously into the pulverizer. By the method comprising step (i), an inorganic oxide powder suitable as a raw material for ceramics can be obtained.

The gas to be used in step (i) may include air, nitrogen or a gas mixture thereof. The mixing ratio of the respective gases in the gas mixture is not specifically limited and, it is acceptable to use, for example, a gas mixture produced by mixing nitrogen with air to increase nitrogen ratio to oxygen more than that in air. It is preferred to use an air, a nitrogen, or a gas mixture thereof with a dew point of about 0° C. or lower, preferably about −30° C. or lower.

In step (i), an introduction amount of gas into a pulverization chamber of the dry-way pulverizer may be from about 25,000 to about 160,000 parts by volume, or preferably about 25,000 to 100,000 parts by volume, based on 100 parts by volume of the inorganic oxide. When the amount of gas introduced is less than 25,000 parts by volume, the density of a ceramic obtained after molding and sintering the inorganic oxide powder may be lowered. In addition, the effect of facilitating a flow of the inorganic oxide in the pulverization chamber of the dry-way pulverizer is insufficient and it tends to be difficult to suppress accumulation of the inorganic oxide in the pulverization chamber. On the other hand, even if the gas amount is increased to be more than about 160,000 parts by volume, it may be difficult to obtain a ceramic with high density. When the gas introduction amount is large, a large scale air supply apparatus maybe required. The introduction amount of the inorganic oxide is represented on the basis of its volume which is calculated from the weight and the density of the inorganic oxide introduced into the pulverization chamber of the dry-way pulverizer. The gas introduction amount is represented on the basis of its volume in a standardized condition (at 0° C. under 1 atmospheric pressure).

Examples of the dry-way pulverizer include a rotation ball mill, a vibration ball mill, a planetary ball mill, a stirring mill and the like, which are classified in accordance with the description in Chemical Engineering Handbook, edited by Chemical Engineering Associate, published by Maruzen Co., Ltd., revised 5th edition, pp. 826–838". Among them, the stirring mill is preferred. A commercially available stirring mill can be employed. Examples thereof include a dry-way continuous-type ultrafine pulverizer (trade name: Dynamic Mill MYD 25-XA type, manufactured by Mitsui Mining Co., Ltd.). A preferred dry-way pulverizer may comprise a pulverization chamber containing a pulverization medium, an introduction inlet for introducing the inorganic oxide into the pulverization chamber and a discharge outlet for discharging the inorganic oxide powder as well as a system for quantitatively introducing a gas to the pulverization chamber. The system may have an air supply apparatus such as an air compressor or an air bomb, which is connected to the pulverization chamber through a pipeline.

In the case of using a commercially available pulverizer, it is preferred to provide an introduction inlet for introducing a gas to the pulverization chamber and/or to install an apparatus for quantitatively supplying a gas to the chamber, if necessary. The introduction of gas into the pulverization chamber may be carried out from a position where the gas flow is kept parallel or opposed to the flow of the inorganic oxide. It is preferred to carry out the introduction such that the gas flow and the flow of the inorganic oxide are kept parallel to each other. A pulverization medium to be put into the pulverization chamber may not be limited in its shape, size and packed ratio to the capacity of the chamber and varies depending on a kind of inorganic oxide to be pulverized, a kind of pulverizer or the like. The pulverization medium may have a spherical shape with the diameter of about 0.2 to about 50 mm, or preferably about 3 to about 30 mm. The packed ratio may be about 30 to about 95%, or preferably about 50 to about 90%, which is based on the capacity of the pulverization chamber.

The inorganic oxide introduced into the dry-way pulverizer is pulverized in the pulverization chamber. The pulverization may be carried out at about 40 to about 300° C., or preferably 100 to about 300° C.

In pulverization, a slight amount of an additive such as water, an alcohol or an aliphatic organic compound may be utilized. An amount of the additive to be used may be about 2% by weight or less, preferably about 1% by weight or less, based on the inorganic oxide. The additive works as a pulverization assisting agent as is or as it is evaporated to easily produce an inorganic oxide powder with little coarse particles.

The inorganic oxide powder pulverized by the dry-way pulverizer may be discharged and recovered through a discharge outlet provided in the pulverization chamber. The inorganic oxide powder thus obtained may be molded and sintered at a high temperature to obtain a ceramic. The molding may be conducted with a molding method in which molds (or dies) are used, in a press casting method in which a press such as a uniaxial press or a isostatic press is used after forming the inorganic oxide to be particles by, for example, a spray drying (which results in increasing the packing density of the inorganic oxide in the molds), in a slip casting or in an injection molding method.

In the case that step (ii) in the present invention is carried out, the inorganic oxide is pulverized in a medium-stirring-type pulverizer under dry conditions. The medium-stirring-type pulverizer is a pulverizer which has a pulverization medium such as balls, beads and the like in a container, transmits the force to the pulverization medium by an inserted stirring means and carries out pulverization mainly with a shearing and friction function of the medium. Based on the structure thereof, the pulverizer can be broadly classified into a screw way (FIG. 1(a), sometimes called as a tower way), a flow-pipe way (FIG. 1(b), sometime called as a disk way), an annular way (FIG. 1(c), sometimes called as a circular way), and a stirring tank way (FIG. 1(d)).

Figure 1B:
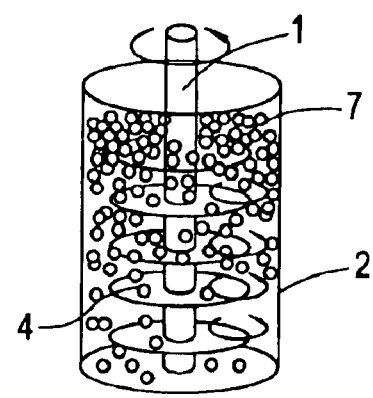
FIG. 1(b) shows a schematic figure of a flow-pipe-way (or a disk-way) medium-stirring-type pulverizer applicable to process (ii) of the present invention.
Figure 1C:
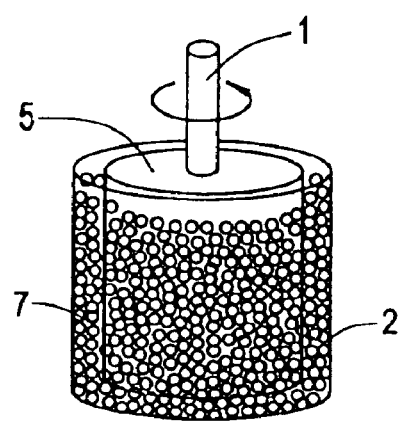
FIG. 1(c) shows a schematic figure of an annular-way (or circular-way) medium-stirring-type pulverizer applicable to process (ii) of the present invention.
Figure 1D:
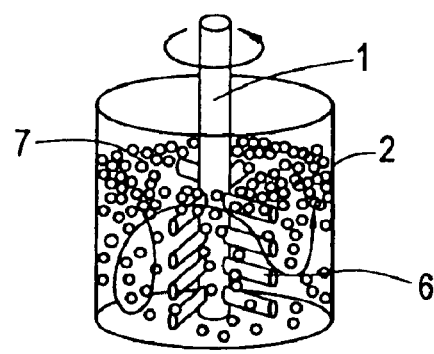
FIG. 1(d) shows a schematic figure of a stirring-tank-way medium-stirring-type pulverizer applicable to process (ii) of the present invention.

The structures of these medium-stirring-type pulverizers are described withreference to FIG. 1(a) to FIG. 1(d) as follows:

As illustrated in FIG. 1(a), the screw-way pulverizer has a structure in which a screw connected with a stirring axle 1 is placed in a container 2. The screw-way pulverizer causes the shearing and friction function on the inorganic oxide (not illustrated) to be pulverized by circulation movement of a pulverization medium 7 in which the pulverization medium 7 in the bottom part of the container 2 is transported by the screw 3 to the upper part of the container 2, the pulverization medium 7 transported to the upper part of the container 2 is allowed to drop to the bottom part of the container 2 along the inner wall of the container 2 and then the pulverization medium 7 is moved to the center of the bottom part. In this pulverizer, the inorganic oxide is generally introduced into the bottom part of the container 2. As illustrated in FIG. 1(b), the flow-pipe-way pulverizer has a structure in which a disk 4 connected with a stirring axle 1 is placed in a container 2. The flow-pipe-way pulverizer, through shearing and friction, pulverizes the inorganic oxide (not illustrated) with circular movement of a pulverization medium 7 caused by the force of rotating disk 4 which is transmitted to the pulverization medium 7. As illustrated in FIG. 1(c), the annular-way pulverizer has a structure in which an inner cylinder 5 connected with a stirring axle 1 is placed in a container 2. The annular-way pulverizer, through shearing and friction, pulverizes the inorganic oxide (not illustrated) by the rotating movement of a pulverization medium 7 packed in a space between the container 2 and the rotating inner cylinder 5, the medium 7 moving to follow the rotation of the inner cylinder 5. As illustrated in FIG. 1(d), the stirring-tank-way pulverizer has a structure in which a stirring arm 6 connected with a stirring axle 1 is placed in a container 2. The stirring-tank-way pulverizer, through shearing and friction, pulverize the inorganic oxide (not illustrated) by the up-and-down movement and circular movement of a pulverization medium 7, which is caused by the force of rotating stirring arm 6 transmitted to the pulverization medium 7. Although vertical batch type pulverizers are exemplified with the reference of FIG. 1(a) to FIG. 1(d), transverse types and continuous types other than the vertical types are also available in the present invention. A pulverizer(s) properly selected among these types or combined with one another may be employed to carry out the pulverization.

It is preferred that the medium-stirring-type pulverizer comprises a container having a cylindrical part made from a ceramic and having a structure with few joining parts such as seams. By such a structure, foreign substance contamination due to pitching of the joining parts can be prevented. Examples of commercially available medium-stirring-type pulverizer include a dry-way continuous-type ultrafine pulverizer (trade name: Dynamic Mill MYD 25-XA type, manufactured by Mitsui Mining Co., Ltd.).

For a pulverization medium, balls, beads and the like made from a ceramic such as alumina, zirconia or the like may be utilized. Among them, spherical one made from alumina is recommended to use. A diameter of the spherical medium may be about 0.2 mm to about 50 mm, or preferably about 3 mm to about 30 mm.

Pulverization in step (ii) may be carried out at a specific energy consumption of from about 0.3 to about 1 kWh/kg and preferably that of from about 0.5 to about 1 kWh/kg. By keeping the specific energy consumption within such a range, the sintering property of the obtained inorganic oxide can be improved. The specific energy consumption is an index calculated as the ratio (W/P [kWh/kg]) of power W to supplying speed P, wherein the supplying speed P [kg/h] is defined as the supplying speed of the inorganic oxide into the pulverizer and the power W [kW] is defined as the power required to drive the medium-stirring means of the pulverizer. The power, for example, can be calculated from the electric power of the power source (e.g. a motor) for driving the medium-stirring means of the pulverizer. The power can be adjusted by changing a length of stirring blades for stirring the pulverization medium, a number of the blades or a rotation speed of the blades and, therefore, it is possible to set a prescribed specific energy consumption by properly adjusting the supplying speed of the inorganic oxide, the rotation speed of the stirring blades and/or the like.

As same in step (i), a small amount of additive such as water, an alcohol and an aliphatic organic compound may be utilized in the pulverization of step (ii). The additive may be utilized at the time of the pulverization or may be added to the inorganic oxide powder before pulverization. An amount of the additive to be used may be about 2% by weight or less, preferably about 1% by weight or less based on the inorganic oxide.

In the present invention, an inorganic oxide powder suitable as a raw material for a high density ceramic can be continuously produced by performing the method comprising step (i). Also, an inorganic oxide powder excellent in a sintering property can be produced by performing the method comprising step (ii). Due to its excellent sintering property, the inorganic oxide powder can provide a high density ceramic even when sintered at a low temperature. In the case of using an aluminum oxide as the inorganic oxide, an aluminum oxide powder which is excellent as a raw material for sintering to obtain a ceramic is provided. Such an aluminum oxide powder may be used as a polishing agent, a filler for resin and the like, as it is or after being classified or after being made to be a slurry.

The entire disclosure of the Japanese Patent Application No. 2000-127221 filed on Apr. 27, 2000 and the Japanese Patent Application No. 2000-266642 filed on Sep. 4, 2000, both indicating specification, claims, drawings and summary, are incorporated herein by reference in their entirety.

EXAMPLES

The present invention is described in more detail by following Examples, which should not be construed as a limitation upon the scope of the present invention.

Measurements of the respective physical properties of the inorganic oxide were carried out as follows.

Purity (%): Purity was measured by an emission spectroanalysis.

BET specific surface area ($m^2/g$): BET specific surface area was measured by a nitrogen adsorption method.

Crystal structure: Crystal structure was measured by an x-ray diffraction method.

Sintering density ($g/cm^3$): Sintering density was measured as follow:

Into a cylindrical mold with 20 mm of inner diameter, 2 g of an inorganic oxide was placed and molded into a pellet by a uniaxial press. After taken out from the molds, the pellet was molded by a hydrostatic press at a molding pressure of 1000 $kgf/cm^2$ (98 MPa), and then was sintered in air at 1450° C. for 2 hours. A density of the obtained sintered pellet was measured by an in-water Archimedes' method, and was referred to as a sintering density of the inorganic oxide.

The theoretical sintering density of aluminum oxide is 3.99 $g/cm^3$. A sintering density closer to the theoretical density means that the aluminum oxide used for the measurement has a higher sintering property.

Example 1

In a pulverization chamber (having an inner capacity of 25 $dm^3$) of a dry-way continuous-type ultrafine pulverizer (trade name: Dynamic Mill MYD 25-XA type, manufactured by Mitsui Mining Co., Ltd.), balls made of alumina with 5 mmφ were placed at a 75% packed ratio thereof to the pulverization chamber capacity. Into the chamber, an air at a room temperature with a dew point of −30° C. or lower, which was supplied from an air supply apparatus, was continuously introduced at 1 Nm³/h through a pipeline connecting the air supply apparatus with the pulverization chamber. Simultaneously, aluminum oxide (having a BET specific surface area of 8.5 m²/g, a density of 3.99 g/cm² and an α type crystal structure) was continuously introduced therein at 15 kg/h and was pulverized to obtain an aluminum oxide powder. The supplied aluminum oxide powder was pulverized and quantitatively discharged out of the pulverizer as an aluminum oxide powder. The introduction amount of air at that time was 26,600 parts by volume (in a standardized condition) based on 100 parts by volume of the aluminum oxide. The temperature of the pulverization chamber was 200° C. During pulverization, the electric powder of the motor for driving the medium-stirring means was constant.

The specific energy consumption calculated using the electric power of the motor and the supplying speed of aluminum oxide was 0.71 kWh/kg. The obtained aluminum oxide powder had a BET specific surface area of 11.8 m²/g and the sintering density of 3.96 g/cm³.

Example 2

An aluminum oxide powder was obtained in the same manner as in Example 1 except that the introduction amount of air was changed (from 26,600 parts by volume in Example 1) to 90,900 parts by volume based on 100 parts by volume of the aluminum oxide. The obtained aluminum oxide powder had a sintering density of 3.95 g/cm³.

Example 3

An aluminum oxide obtained by an alkoxide method (and having a purity of 99.99%, a BET specific surface area of 5.5 m²/g and an α-type crystal structure) was introduced at supplying speed of 15 kg/h into the same dry-way continuous-type ultrafine pulverizer as used in Example 1 (using balls made of alumina in the same manner as in Example 1) and was pulverized in a dry way. The supplied aluminum oxide was pulverized and quantitatively discharged out of the pulverizer as an aluminum oxide powder. During pulverization, the electric power of the motor for driving the medium-stirring means was constant. The specific energy consumption calculated from the electric power of the motor and the supplying speed of the aluminum oxide was 0.76 kWh/kg. The obtained aluminum oxide powder had a BET specific surface area of 7.8 m²/g and a sintering density of 3.97 g/cm³.

Example 4

The same kind of aluminum oxide as used in Example 3 was introduced at supplying speed of 12 kg/h into the same dry-way continuous-type ultrafine pulverizer as used in Example 1 (using balls made of alumina in the same manner as in Example 1) and was pulverized in a dry way while water being introduced in an amount of 0.6% by weight based on the aluminum oxide. The specific energy consumption was 0.65 kWh/kg. The obtained aluminum oxide powder had a BET specific surface area of 7.5 m²/g and a sintering density of 3.97 g/cm³.

Example 5

The same kind of aluminum oxide was pulverized in dry way in the same manner as in Example 4 except that ethanol was introduced in an amount of 0.5% by weight based on the aluminum oxide instead of introducing water in an amount of 0.6% by weight based on the aluminum oxide. The specific energy consumption was 0.50 kWh/kg. The obtained aluminum oxide powder had a the BET specific surface area of 6.9 m²/g and a sintering density of 3.95 g/cm³.

Example 6

The same kind of aluminum oxide as used in Example 3 was introduced at supplying speed of 6.5 kg/h into the same dry-way continuous-type ultrafine pulverizer as used in Example 1 (using balls made of alumina in the same manner as in Example 1) and was pulverized in a dry way while polypropylene glycol being introduced in amount of 0.5% by weight based on the aluminum oxide. The specific energy consumption was 0.64 kWh/kg. The obtained aluminum oxide powder had a BET specific surface area of 6.6 m²/g and a sintering density of 3.95 g/cm³.

Comparative Example 1

An aluminum oxide was pulverized in the same manner as in Example 6 except that the supplying speed of the aluminum oxide was changed from 6.5 kg/h to 7.5 kg/h and that the specific energy consumption was 1.08 kWh/kg. The obtained aluminum oxide powder had a BET specific surface area of 15.3 m²/g and a sintering density of 3.87 g/cm³.

Comparative Example 2

The same kind of aluminum oxide as used in Example 1 was introduced into a dry-way vibration ball mill (trade name 25 YAMB-800JWS type; produced by Yasukawa Commercial Co. Ltd.; using balls with 15 mmφ made of alumina as the pulverization medium) and was pulverized in a dry way. The specific energy consumption was 0.52 kWh/kg, which was calculated by using the power W necessary for driving the mill as the electric power of the motor for vibration the vibration ball mill. The obtained alumina powder had a BET specific surface area of 9.6 m²/g density of 3.84 g/cm³.

Comparative Example 3

The same kind of aluminum oxide as used in Example 1 was introduced into the same dry-way vibration ball mill as used in Comparative Example 2 (using balls made of alumina in the same manner as in Comparative Example 2) and was pulverized in a dry way while ethylene glycol being introduced in an amount of 0.5% by weight based on the aluminum oxide. The specific energy consumption was 3.47 kWh/kg. The obtained aluminum oxide powder had a BET specific surface area of 12.1 m²/g and a sintering density of 3.90 g/cm³.

What is claimed is:

1. A method for producing an alumina powder which comprises a step of pulverizing an aluminum oxide with purity of about 99.9% or higher and a BET specific surface area of from about 1 to about 70 m²/g in a medium-stirring pulverizer under dry conditions at a specific energy consumption of from about 0.3 to about 1 kWh/kg.

2. A method for producing an alumina powder according to claim 1, wherein the aluminum oxide is an aluminum oxide obtained by an alkoxide method comprising a step of hydrolyzing an organoaluminium compound.

* * * * *